US012741397B2

(12) United States Patent
Bhagavat et al.

(10) Patent No.: US 12,741,397 B2
(45) Date of Patent: Sep. 22, 2026

(54) SYSTEMS AND METHODS FOR CONTROLLING SURFACE PROFILES OF WAFERS SLICED IN A WIRE SAW

(71) Applicant: GlobalWafers Co., Ltd., Hsinchu (TW)

(72) Inventors: Sumeet S. Bhagavat, St. Charles, MO (US); Carlo Zavattari, Varallo Pombia (IT); Peter D. Albrecht, O'Fallon, MO (US); William L. Luter, St. Charles, MO (US)

(73) Assignee: Globalwafers Co., Ltd., Hsinchu (TW)

( * ) Notice: Subject to any disclaimer, the term of this patent is extended or adjusted under 35 U.S.C. 154(b) by 369 days.

(21) Appl. No.: 18/327,427

(22) Filed: Jun. 1, 2023

(65) Prior Publication Data

US 2023/0390962 A1 Dec. 7, 2023

Related U.S. Application Data

(60) Provisional application No. 63/365,921, filed on Jun. 6, 2022.

(51) Int. Cl.
*B28D 5/00* (2006.01)
*B28D 5/04* (2006.01)
*B28D 7/00* (2006.01)

(52) U.S. Cl.
CPC ........... *B28D 5/0064* (2013.01); *B28D 5/045* (2013.01); *B28D 7/005* (2013.01)

(58) Field of Classification Search
CPC .................... G05B 2219/32181; B28D 5/0064
See application file for complete search history.

(56) References Cited

U.S. PATENT DOCUMENTS

| | | | | |
|---|---|---|---|---|
| 9,073,135 | B2 | 7/2015 | Huber et al. | |
| 2009/0288530 | A1 | 11/2009 | Oishi et al. | |
| 2010/0258103 | A1 | 10/2010 | Kitagawa | |
| 2013/0139800 | A1 | 6/2013 | Zavattari et al. | |
| 2013/0139801 | A1* | 6/2013 | Zavattari | B28D 5/0064 125/12 |
| 2013/0144420 | A1* | 6/2013 | Zavattari | B28D 5/0064 125/12 |
| 2013/0144421 | A1 | 6/2013 | Zavattari et al. | |
| 2013/0174828 | A1* | 7/2013 | Zavattari | B28D 5/007 125/21 |
| 2018/0056545 | A1 | 3/2018 | Albrecht et al. | |
| 2022/0234250 | A1* | 7/2022 | Pietsch | B28D 5/0076 |

FOREIGN PATENT DOCUMENTS

| | | | | |
|---|---|---|---|---|
| CN | 111993614 A | * 11/2020 | | B28D 5/045 |
| DE | 102019207719 A1 | 12/2020 | | |
| KR | 20180125039 A | * 11/2018 | | B28D 5/045 |

OTHER PUBLICATIONS

International Search Report and Written Opinion issued by the International Searching Authority in PCT/US2023/024219 mailed on Oct. 6, 2023, pp. 1-13.

* cited by examiner

*Primary Examiner* — Suresh Suryawanshi
(74) *Attorney, Agent, or Firm* — Armstrong Teasdale LLP

(57) ABSTRACT

Systems and methods for controlling the surface profiles of wafers sliced in a wire saw machine. The systems and methods are generally operable to alter the nanotopology of wafers sliced from an ingot by controlling the shape of the wafers. The shape of the wafers is altered for example by changing the temperature of a temperature-controlling fluid circulated in fluid communication with side walls attached to a fixed bearing sidewall of the wire saw.

15 Claims, 10 Drawing Sheets

SYSTEMS AND METHODS FOR CONTROLLING SURFACE PROFILES OF WAFERS SLICED IN A WIRE SAW

CROSS REFERENCE TO RELATED APPLICATION

This application claims priority to U.S. Provisional Patent Application No. 63/365,921, filed on Jun. 6, 2022, the disclosure of which is hereby incorporated by reference in its entirety.

FIELD

This disclosure relates generally to wire saw machines used to slice ingots into wafers and, more specifically, to systems and methods for controlling the surface profiles of semiconductor wafers sliced in the wire saw machines.

BACKGROUND

Semiconductor wafers, such as silicon wafers, are typically sliced from an ingot using a wire saw machine. These ingots are often made of silicon or other semiconductor or solar grade material. In operation, the ingot is contacted by a web of moving wires tensioned against bearings and rollers in the wire saw that slice the ingot into a plurality of wafers. Wafers cut by known saws may have surface defects that cause the wafers to have nanotopology that deviates from set standards. To ameliorate the deviating nanotopology, such wafers may be subject to additional processing steps. These steps are time-consuming and costly.

Surface defects formed during cutting of the ingot can occur at least in part due to thermal deformation of components of the wire saw. Side walls supporting the rollers can deform or expand during the cutting process, resulting in relative movement of the tensioned wires. The cutting process can take several hours to complete, resulting in an increase of temperature over time, with the largest increase in temperature occurring in the initial hours of the cutting operation. Controlling the deformation of the side walls during the cutting operation can reduce surface defects in the cut wafers.

Moreover, known wire saw machines are not operable to adjust the shape and/or warp of the surfaces of the wafers cut from the ingot by the machines. Thus, there exists a need for a more efficient and effective system to control nanotopology of wafers cut in a wire saw machine.

This section is intended to introduce the reader to various aspects of art that may be related to various aspects of the disclosure, which are described and/or claimed below. This discussion is believed to be helpful in providing the reader with background information to facilitate a better understanding of the various aspects of the present invention. Accordingly, these statements are to be read in this light, and not as admissions of prior art.

SUMMARY

In one aspect, a system for controlling the surface profile of wafers sliced from an ingot in a wire saw is disclosed. The system includes a wire saw base including a fixed bearing sidewall and a free bearing sidewall opposite the fixed bearing sidewall. A wire guide assembly supports wires, and the wire guide assembly includes rollers having a first end connected to the fixed bearing sidewall and a second end supported by the free bearing sidewall. A wire guide rotates on a bearing, wherein thermal deformation of the fixed bearing sidewall from a first state to a second state corresponds to a change in a cutting surface profile of a cut wafer from a first cutting surface profile to a second cutting surface profile. A temperature regulation system is attached to the fixed bearing sidewall for controlling thermal deformation of the fixed bearing sidewall. A control system for controlling the temperature of the fixed bearing sidewall includes a temperature sensor for measuring the temperature of the fixed bearing sidewall. A processor is connected to the temperature regulation system and the control system, and the processor is configured to control the temperature of the fixed bearing sidewall at a desired temperature by activating the temperature regulation system.

Another aspect is a system for controlling a cutting surface profile of wafers cut from an ingot by a wire saw. The system includes a temperature regulation system attached to a fixed bearing sidewall of a wire saw base for controlling thermal deformation of the fixed bearing sidewall. A control system for controlling the temperature of the fixed bearing sidewall includes a temperature sensor for measuring the temperature of the fixed bearing sidewall and a displacement sensor for measuring thermal deformation of the fixed bearing wall. A processor is connected to the temperature regulation system and the control system, the processor configured to control the temperature of the fixed bearing sidewall at a desired temperature by activating the temperature regulation system.

In yet another aspect, method for slicing an ingot into wafers using a wire saw is disclosed. The method includes receiving an input from a user, the input including a desired wafer surface profile corresponding to a temperature set point of a fixed bearing sidewall of a wire saw base; activating a temperature regulation system attached to the fixed bearing sidewall for controlling thermal deformation of the fixed bearing sidewall, the thermal deformation of the fixed bearing sidewall corresponding to the desired wafer surface profile; and, initiating a slicing operation such that wires supported by a wire guide assembly cut wafers from the ingot, the wire guide assembly including rollers having a first end connected to the fixed bearing sidewall and a second end supported by a free bearing sidewall of the wire saw base, wherein the wire guide rotates on a bearing, wherein thermal deformation of the fixed bearing sidewall from a first state to a second state corresponds to a change in a cutting surface profile of a cut wafer from a first cutting surface profile to a second cutting surface profile.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
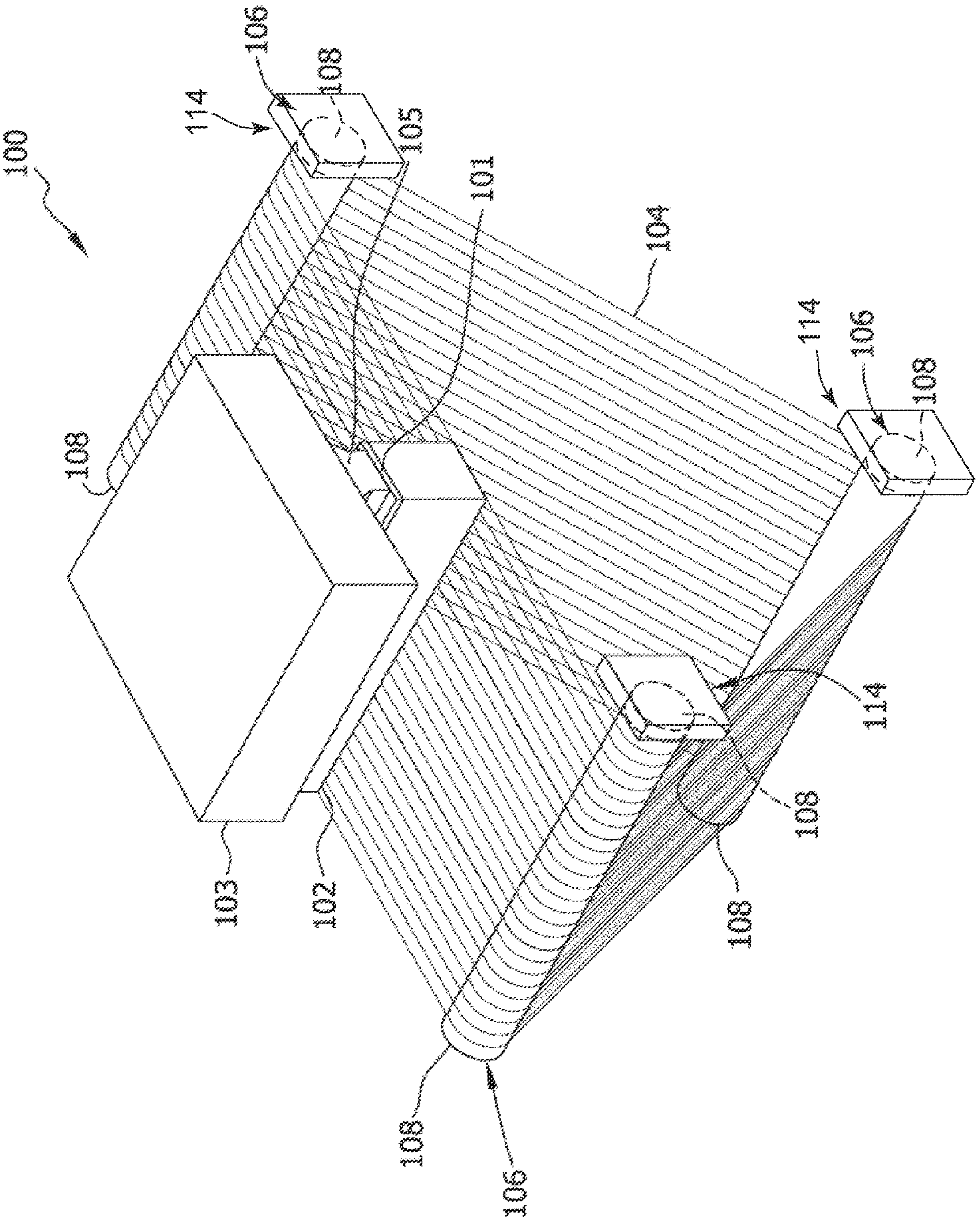
FIG. 1 is a perspective view of a system including an ingot and a wire saw machine.

Referring to the drawings, an example system for controlling the surface profile of wafers cut from an ingot 102 by a wire saw machine 103 is shown in FIG. 1 and indicated generally at 100. As used herein, the terms "surface profile" or "wafer surface profile" refer to both the nanotopology and shape of the surfaces of wafers.

The systems and methods described herein are generally operable to control the shape, and thus the nanotopology, of wafers sliced from an ingot by controlling the shape of the wafers. The shape of the wafers may be controlled by controlling the temperature of side walls of the wire saw to which bearings are attached to. The bearings support wire guides of the saw. The temperature of at least one of the walls of the wire saw base is controlled by a temperature regulation system attached to the fixed bearing sidewall or both side walls of the wire saw bar for controlling thermal deformation of the side wall. Different feedback systems may be used to determine the temperature of the side walls, as well as the deformation of the side walls necessary to generate wafers having the desired shape and/or nanotopology, though such feedback systems are not required. Nanotopology has been defined as the deviation of a wafer surface within a spatial wavelength of about 0.2 mm to about 20 mm. This spatial wavelength corresponds very closely to surface features on the nanometer scale for processed semiconductor (e.g., silicon) wafers. The foregoing definition has been proposed by Semiconductor Equipment and Materials International (SEMI), a global trade association for the semiconductor industry (SEMI document 3089). Nanotopology measures the elevational deviations of one surface of the wafer and does not consider thickness variations of the wafer, as with traditional flatness measurements. Several metrology methods have been developed to detect and record these kinds of surface variations. For instance, the measurement deviation of reflected light from incident light allows detection of very small surface variations. These methods are used to measure peak to valley (PV) variations within the wavelength. Nanotopology can be predicted or estimated based on measurements taken of the surface of the wafer after it has been sliced, but before it is subject to polishing.

Figure 2:
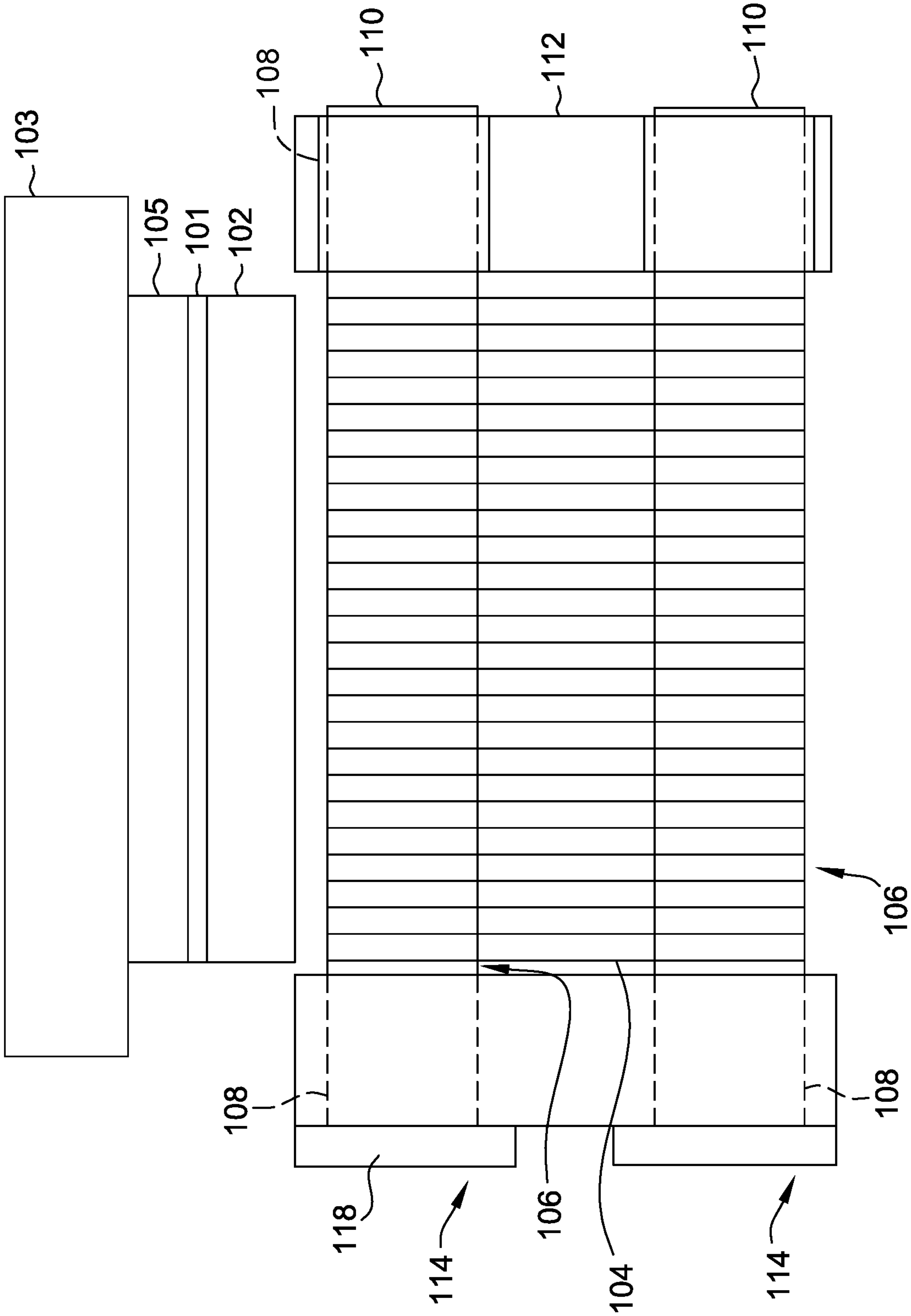
FIG. 2 is an end view of the system of FIG. 1.

The wire saw 103 (i.e., a wire saw machine) is of the type used to slice (i.e., cut or saw) the ingot 102 into wafers with a web of wires 104. The ingot 102 is connected to a bond beam 101, which is in turn connected to a clamping rail 105. The clamping rail 105 is connected to the wire saw 103. The web of wires 104 (best shown in FIG. 2, only one of the wires is shown in the end view of FIG. 3) travel along a circuitous path around three wire guides 106 when slicing the ingot 102. The number of wires 104 shown in FIG. 2 is greatly reduced for clarity, and their spacing is likewise greatly exaggerated for clarity. One or more of the wire guides 106 may be connected to a drive source to rotate the guides, and in turn the web of wires 104.

In the example embodiment, the wire saw 103 is used to slice ingots 102 made of a semiconductor material (e.g., silicon) or a photovoltaic material. The wire saw 103 may also be used to slice ingots of other materials into wafers.

The wire guides 106 have opposing ends 108, 110, each of which is connected to a frame 112 (only a portion of which is shown in FIG. 2) of the wire saw 103 by a bearing 114. The frame 112 includes a fixed bearing sidewall 180 and a free bearing sidewall opposite 182 the fixed bearing sidewall 180.

Figure 3:
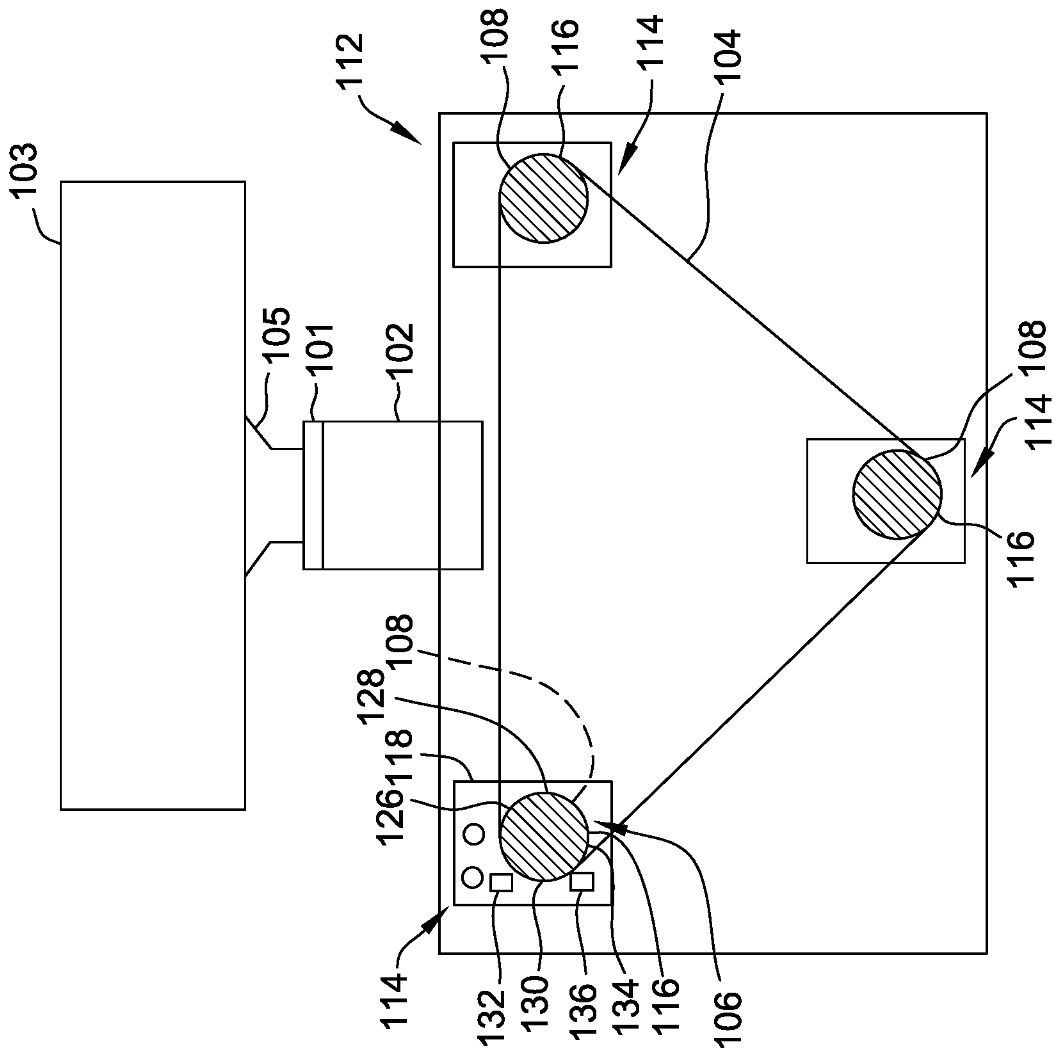
FIG. 3 is a left side view of the system of FIG. 1.

Each bearing 114 of the fixed bearing sidewall 180 has a rotating race 116 that is connected to a respective end 108 of the wire guide 106 and a stationary race 118 that is connected to the fixed bearing sidewall 180. The rotating race 116 is best seen in FIG. 3. The rotating race 116 rotates as the wire guide 106 to which it is connected rotates. Likewise, the stationary race 118 does not appreciably move as the rotating race 116 and wire guide 106 rotate. In the example embodiment, the bearings 114 are typical roller bearings, although in other embodiments they may be any other suitable type of bearing (e.g., roller bearings).

Figure 4:
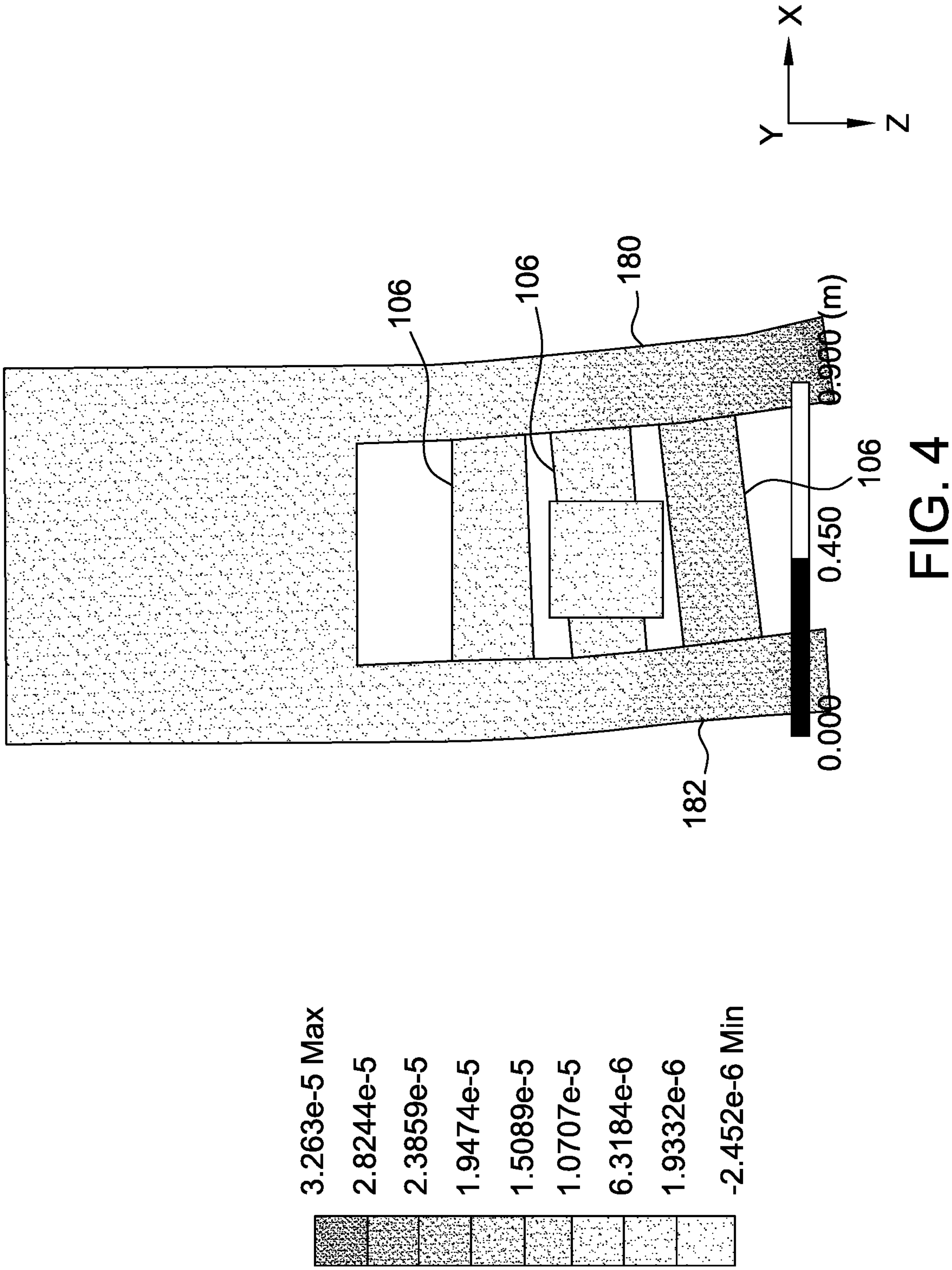
FIG. 4 is a perspective view of the wire saw machine of FIG. 1.

As shown in FIG. 4, the frame 112 can thermally deform during the cutting process. Thermal deformation of the frame 112 alters the surface profile resulting in surface defects of the cut ingot. Because the wire guides 106 are connected to the fixed bearing sidewall 180 but are movable relative to the free bearing sidewall 182, the wire guides 106 shift less due to thermal deformation of the free bearing sidewall 182. Stated differently, a first state is defined by the frame 112 and the sidewalls (180, 182) without thermal deformation and a second state is defined by the frame 112 under thermal deformation of the fixed bearing sidewall 180. An ingot cut in the first state can have a different surface profile from an ingot cut in the second state. As explained in further detail below, a temperature regulation system 200 can be attached to the fixed bearing sidewall 180 for controlling or reducing thermal deformation of the fixed bearing sidewall 180 by regulating the temperature of the fixed bearing sidewall 180. In some embodiments, the temperature regulation system 200 can also be attached to the free bearing sidewall 182 to regulate the temperature of the free bearing sidewall 182. Embodiments of the temperature regulation system 200 discussed below, can be attached to either the fixed bearing sidewall 180, the free bearing sidewall 182 or both.

While the primary function of the temperature regulation system 200 is to reduce thermal expansion, and therefore deflection, of the fixed bearing sidewall 180, in some embodiments, the temperature regulation system 200 can also be configured to selectively increase the temperature of the fixed bearing sidewall 180 as explained in further detail below. Because the temperature regulation system 200 can selectively thermally deform either wall, surface profile variations caused by external and uncontrolled sources can be corrected by operation of the temperature regulation system 200.

Figure 6:
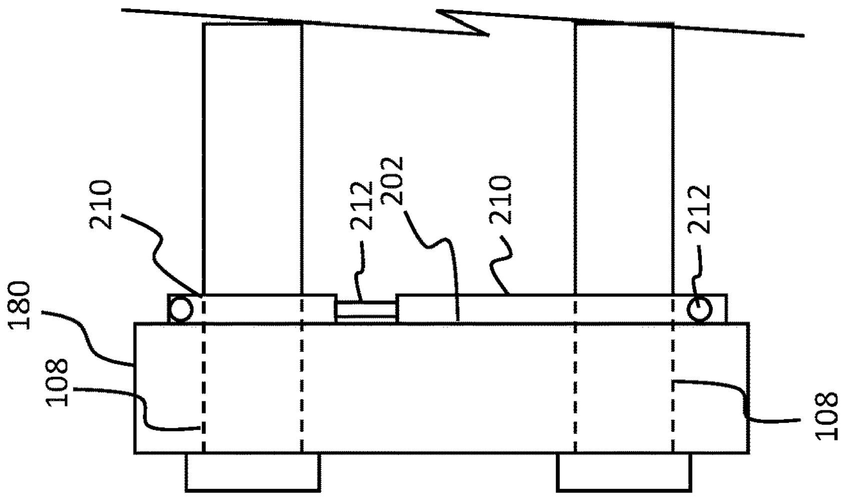
FIG. 6 is a front view of the temperature regulation system of FIG. 5.
Figure 5:
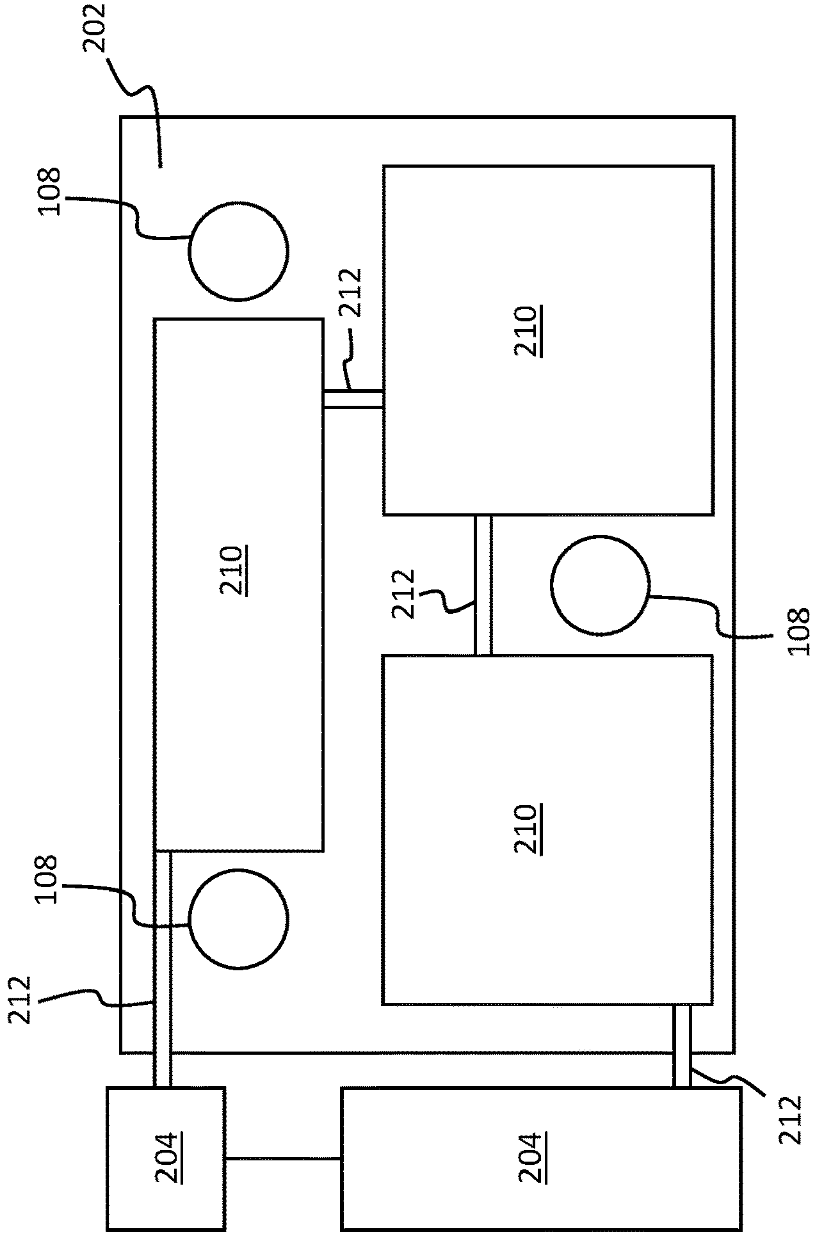
FIG. 5 is a side view of a temperature regulation system in accordance with an embodiment of the present disclosure.

FIG. 5 illustrates a side view of a heat exchanger 210 of the temperature regulation system 200 positioned on an inner surface 202 of the fixed bearing sidewall 180. FIG. 6 illustrates a front view of the heat exchanger 210 positioned on the outer surface of the fixed bearing sidewall 180. The heat exchanger 210 can be positioned near regions that are most susceptible to thermal deformation, and the heat exchanger 210 can be connected to more heat exchangers 210 on the inner surface 202. The heat exchanger 210 is suitably a Peltier cooler, a thermoelectric cooler module or a solid-state heat pump. In some embodiments, the heat exchanger 210 includes a highly conductive thermal plate which abuts the inner surface 202 with a reservoir 206 adjacent to the thermal plate. The reservoir 206 can have fluid passing through it to promote the transfer of heat from the thermal plate to the inner surface 202. In some embodiments, fluid conduits 212 can connect multiple heat exchangers 210 to an external reservoir 206 (not shown) defining a fluid circuit. In some embodiments, the fluid circuit includes a valve or pump connected to a processor as explained in further detail below. In some embodiments, the heat exchanger 210 is a cooling jacket.

The heat exchanger 210 may also be retrofit onto existing frames 112. By way of example, the heat exchanger 210 can be affixed onto the inner surface 202 of the fixed bearing sidewall 180 and connected to the external reservoir 206 and valve or pump. In some embodiments, the inner surface 202 of the fixed bearing sidewall 180 can include slots sized to receive the heat exchanger 210 such that the heat exchanger 210 is substantially flush with the inner surface 202 of the fixed bearing sidewall 180, thus reducing the footprint of the heat exchanger 210.

Figure 8:
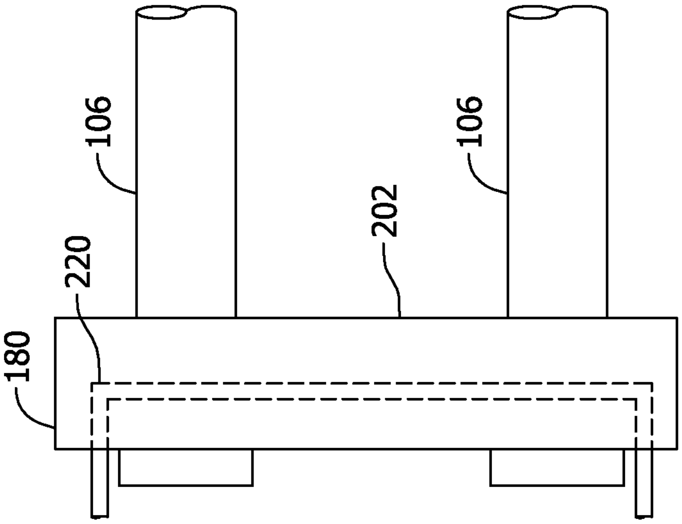
FIG. 8 is a front view of the temperature regulation system of FIG. 7.
Figure 7:
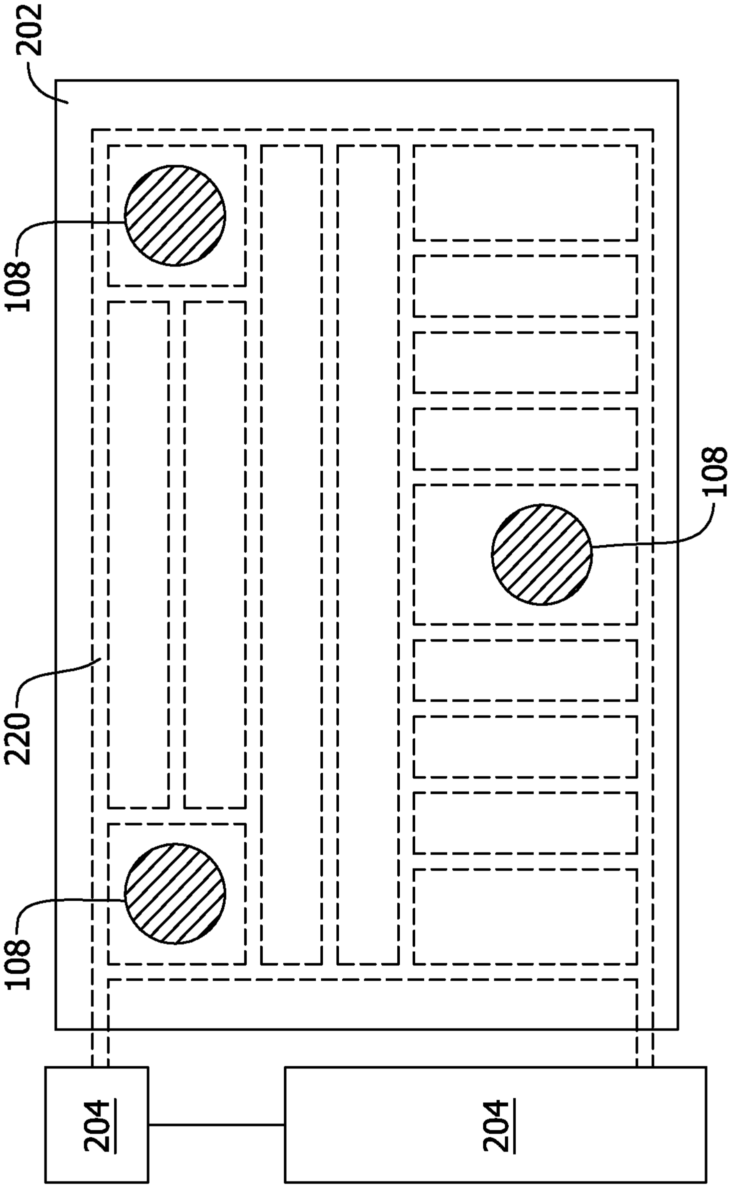
FIG. 7 is a side view of a temperature regulation system in accordance with an embodiment of the present disclosure.
Figure 10A:
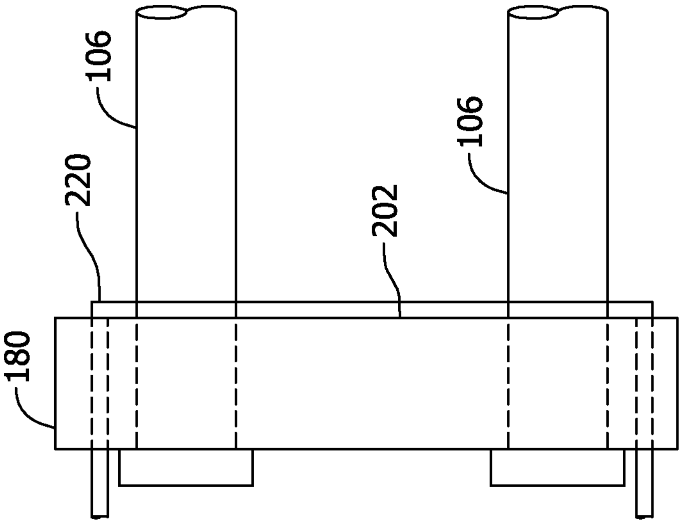
FIG. 10A is a front view of the temperature regulation system of FIG. 9.
Figure 9:
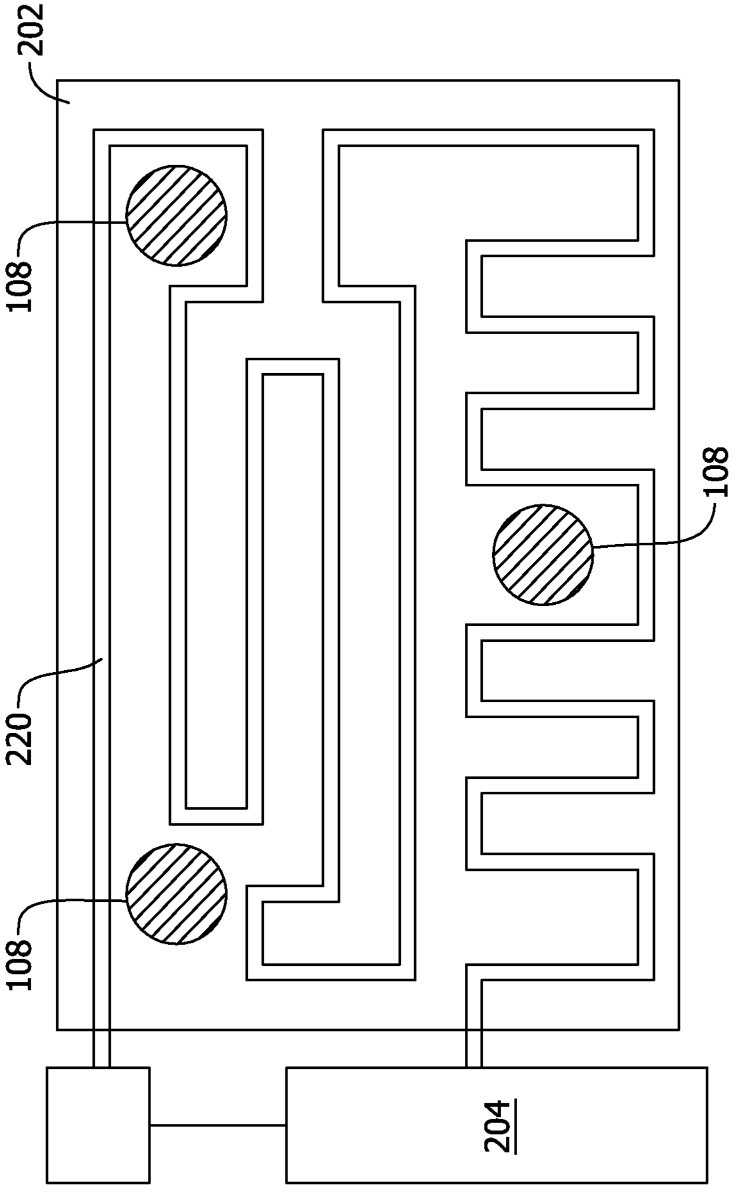
FIG. 9 is a side view of a temperature regulation system in accordance with an embodiment of the present disclosure.
Figure 10B:
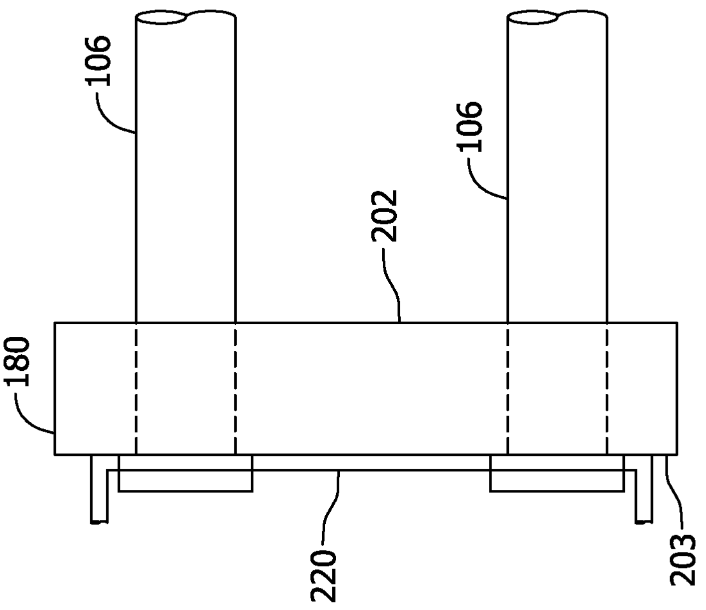
FIG. 10B is a front view of the temperature regulation system of FIG. 9 in accordance with an embodiment of the present disclosure.

FIGS. 7-10B illustrate embodiments of fluid channels 220 of the temperature regulation system 200. FIGS. 9-10B illustrate the fluid channels 220 internal to (or inside) the fixed bearing wall 180 and illustrate the fluid channels 220 external to the fixed bearing wall 180, positioned on the inner surface 202 of the fixed bearing sidewall 180. FIGS. 7 and 9 illustrate a front view of the fluid channels 220 positioned on the inner surface 202 of the fixed bearing sidewall 180.

As best shown in FIG. 8, the fluid channels 220 may be internal to or embedded within the fixed bearing wall 180. As best shown in FIG. 10A the fluid channels 220 may be disposed on inner surface 202 of the fixed bearing sidewall 180 and are oriented towards the wire guides 106, and as best shown in FIG. 10B, the fluid channels 220 may be disposed on an outer surface 203 of the fixed bearing sidewall 180, the outer surface 203 opposite the inner surface 202.

The fluid channels 220 can be positioned near regions that are most susceptible to thermal deformation. As best shown in FIG. 7, in some embodiments, the fluid channels 220 can follow pathways in series or parallel, and as best shown in FIG. 9, the fluid channels 220 can include a single channel. The fluid channels 220 may be connected to an external reservoir 206 (not shown) defining a fluid circuit. In some embodiments, the fluid circuit includes a valve or pump connected to a processor as explained in further detail below.

The fluid channels 220 may also be retrofit onto existing frames 112. For example, the fluid channels 220 can be affixed onto the inner surface 202 of the fixed bearing sidewall 180 and connected to the external reservoir 206 and valve or pump as shown in FIGS. 9 and 10. In some embodiments, the inner surface 202 of the fixed bearing sidewall 180 can include slots sized to receive the fluid channels 220 such that the fluid channels 220 are substantially flush with the inner surface 202 of the fixed bearing sidewall 180, thus reducing the footprint of the fluid channels 220.

A temperature-controlling fluid (referred to interchangeably as "fluid") is in thermal communication with the temperature regulation system 200 such that the fluid is contact with at least a portion of the fixed bearing sidewall 180.

In the example embodiment, fluid conduits 212 receive fresh fluid from the reservoir 206. The fluid conduits 212 can be pipes, hoses, or other suitable structures (not shown).

A displacement sensor 130 (broadly, a "sensor") is disposed adjacent the rotating race 116 for measuring movement and/or axial displacement of the race. Likewise, another displacement sensor 132 may be disposed adjacent the stationary race 118 for measuring displacement of the race. In other embodiments, one of these sensors 130, 132 may be omitted. In the example embodiment, these sensors 130, 132 measure axial displacement of the respective races 116, 118 and are non-contact sensors. In other embodiments, the sensors 130, 132 may be configured and/or positioned differently to measure different types of movement of the bearings 114. The sensors 130, 132 are in communication with a processor 140 (discussed in greater detail below) by any suitable communication system (e.g., a wired and/or wireless network).

Only one of each sensor 130, 132 is shown in the Figures for clarity, although each race of each bearing 114 that is in thermal communication with the fluid has such sensors in the example embodiment. In other embodiments, sensors 130, 132 may be positioned adjacent different bearings 114 or portions thereof to measure displacement of the respective bearings or portions thereof.

Temperature sensors are disposed in thermal communication with the fluid to measure its temperature. In the example embodiment, a temperature sensor 134 is positioned adjacent the rotating race 116 and a temperature sensor 136 is positioned adjacent the stationary race 118. Thus, the temperature sensors 134, 136 are positioned adjacent each race in thermal communication with the fluid that is in turn in thermal communication with the respective races. As the fluid in these locations is in thermal communication with the respective races 116, 118, the temperature of the fluid is indicative of the temperature of the races. In the example embodiment, it is assumed that the temperature of the fluid adjacent to the respective race 116, 118 is generally equal to the temperature of the race. In other embodiments, this may not be the case and the temperature of the fluid adjacent the races 116, 118 differs from the temperature of the race. A high flow rate of the fluid is applied to the system such that the temperature of the fluid throughout the respective race 116, 118 is maintained at an equal value. Low flow rates would result in a temperature differential at the inlet of the system relative to the outlet of the system due to heat absorbed throughout the temperature regulation system 200.

The temperature sensors 134, 136 are communicatively connected to the processor 140 (discussed in greater detail below) by any suitable communication system (e.g., a wired and/or wireless network). The processor, shown schematically in FIGS. 2 and 3 and indicated generally at 140, is communicatively connected to the temperature sensors 134, 136, the displacement sensors 130, 132, and the temperature regulation system 200. Generally, and as discussed in greater detail below, the processor 140 is configured for receiving an input from a user identifying a desired wafer nanotopology profile or shape of wafers sliced from the ingot. Alternatively, the processor 140 is configured to maintain the temperature at a set level to reduce deformation. Based on this input and the measured temperature of the fluid, the processor 140 communicates instructions to the temperature regulation system 200 to control (i.e., adjust, alter or change) the temperature of the fluid.

The flow rate is maintained generally constant. The temperature for the fluid can be controlled by activating heaters or chillers (not shown) connected to the reservoir 206. The reservoir 206 has a sufficient volume such that the fluid circulated through the reservoir 206 is uniformly heated or cooled. Alternatively, fluid can be partially expelled from the reservoir 206 and fresh fluid can be added to the reservoir 206. The fresh fluid having the target temperature such that the reservoir 206 reaches the target temperature.

This change in temperature of the fixed bearing sidewall 180 alters their displacement and that of the wire guides 106 and wires 104. Control of the displacement of the wire guides 106 and wires 104 controls the shape of the surfaces of the wafers, which in turn controls the nanotopology of the surfaces.

Figure 11:
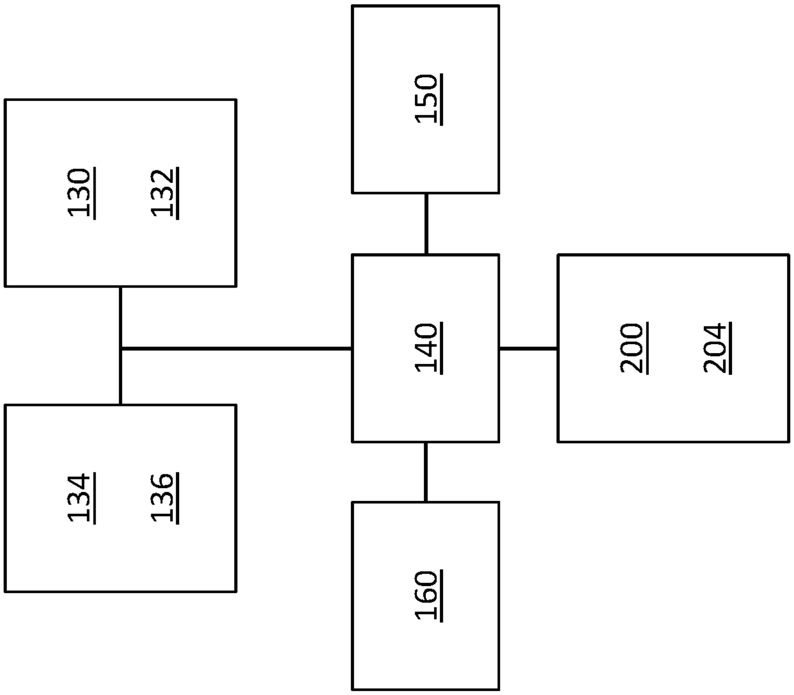
FIG. 11 is a block diagram of a processor in accordance with an embodiment.

The operation of the processor 140 and system 100 are now described in greater detail. An input device 160 as shown in FIG. 11 is communicatively connected to the processor 140 and may be used to receive the input identifying the desired wafer nanotopology or wafer shape from a user. In other embodiments, the processor 140 may receive this input from another computer system communicatively connected to the processor.

Once this input is received by the processor 140, the processor retrieves a recipe associated with the input from a memory 150. The memory is described in greater detail below. The recipe specifies a temperature set point (i.e., a desired temperature) of the fixed bearing sidewall 180 and/or temperature-controlling fluid associated with the recipe. The recipe may also include displacement measurements for the bearings in addition to or in substitution for the temperature set points of the bearings and/or fluid. Adherence to the temperature and/or displacement measurements contained in the recipe during cutting of the ingot 102 by the saw 103 will generally yield wafers having characteristics the same or similar to those as the input. The recipe may be referred to interchangeably as a "temperature profile", a "displacement profile", and/or a "temperature displacement profile". The processor sends a signal to activate heaters or chillers connected to the reservoir 206.

The recipes can be created according to a variety of methods. The specific temperatures and/or displacements of each recipe may be determined experimentally (i.e., during previous slicing operations) or empirically based on the material properties of the bearings 114 (i.e., the co-efficient(s) of thermal expansion of the materials of the bearing). In one embodiment, the recipes are created experimentally by measuring the temperature of the fluid, bearing, and/or the displacement of the bearings 114 during slicing of the ingot 102 and storing these measurements in the memory 150. The surface of at least one of the wafers is then measured and the characteristics of the shape and/or nanotopology of the wafer are then stored in the memory 150. Together with the temperature measurements and/or displacement measurements, these characteristics of the wafer form the recipe. As described below, this process may also be used to periodically update the recipes.

As described above, in the example embodiment the temperature of the bearings 114 is generally equivalent to the temperature of the temperature-controlling fluid that is in thermal communication with the bearings. The recipes are associated with the inputs, such that use of the recipe by the system will result in wafers sliced by the saw 103 having the desired nanotopology and/or shape of the input. These recipes are stored in the memory 150 communicatively connected to the processor 140. This memory 150 is any suitable form of computer readable media, including tangible storage devices (e.g., a hard disk drive, flash memory, optical drives, etc.).

These temperatures of the fluid will yield changes in position of the bearings 114 due to changes of the fixed bearing sidewall 180 that will result in the wafers sliced by the saw having the desired nanotopology and/or shape. In the example embodiment, the processor 140 retrieves the temperature set points from the memory 150.

In operation, the saw 103 then begins slicing the ingot 102 and the processor 140 communicates instructions to the temperature regulation system 200 to adjust the temperature of the fluid in the reservoir 206 based on the temperature set point and the measured temperature of the fluid. For example, the processor 140 can be connected to a heater or chiller (not shown). Once the temperature of the fluid equals that of the temperature set point, the processor 140 sends instructions to the heater or chiller to cease adjusting the temperature of the fluid. The processor 140 may continue to monitor the temperature measurements received from the temperature sensors 134, 136.

A controlled deformation of the fixed bearing sidewall 180 can be achieved by heating or cooling only one surface of the fixed bearing sidewall 180. The processor 140 can be connected to a pump or valve (204) to shut off or throttle flow to a heat exchanger 210 of either the inner or outer surface of the fixed bearing sidewall 180.

This change in temperature of the fixed bearing sidewall 180 resultant from the change in flow rate of the fluid alters their displacement and that of the wire guides 106 and wires 104. Control of the displacement of the wire guides 106 and wires 104 controls the shape of the surfaces of the wafers, which in turn controls the nanotopology of the surfaces.

The fluid may be chilled plant water of relatively constant temperature (e.g., between about 5° C. and about 10° C.) that is obtained from the reservoir 206 or other source before being circulated in contact with the fixed bearing sidewall 180. After contact with the bearings, the fluid is returned to the reservoir 206.

The temperature sensors 134, 136 are suitably used to measure the temperature of the fluid and/or the fixed bearing sidewall 180. The temperature regulation system 200 described above can be used to control the temperature of the fluid, and the recipes may include the temperature set points of the bearings in addition to the temperature set points of the fluid.

The temperature set points may also be determined based on a measured displacement of the stationary race 118 and/or rotating race 116 of the bearing 114. For example, if the measured displacement of the fixed bearing sidewall 180 is within a range of displacements specified by the recipe, the temperature set point may be adjusted such that the temperature of the fluid in thermal communication with the fixed bearing sidewall 180 and/or the flow rate of the fluid is not altered. The measured displacement of the fixed bearing sidewall 180 may thus serve as feedback to the processor to adjust the temperature set point.

Recipes or processes may be updated after slicing operations by measuring the surfaces of the wafers sliced from the ingot. For example, the surface of the wafers may be measured and compared to the desired wafer shape and/or nanotopology profile input by the user. If the measurements of the surface differ from those input by the user, the recipe may be updated. This update may comprise adjusting the temperature set points of the fluid and/or flow rate of the fluid included in the recipe. The update can also include adjustments in the desired displacements of the portions of the fixed bearing sidewall 180.

In another embodiment, the displacement of the fixed bearing sidewall 180 is measured by the displacement sensors 130, 132 at set intervals during slicing of the ingot 102. The displacement measurements are then received by the processor 140. In response to the received measurements, the processor 140 determines the temperature set point of the fixed bearing sidewall 180 necessary to reduce or eliminate their displacement and ameliorate the negative effects that such displacement can have on the wafers.

The processor 140 then communicates instructions to the temperature regulation system 200 to control the temperature of the fluid based at least in part on the measured displacement of the fixed bearing sidewall 180. In embodiments using the valve 204, the processor 140 can also communicate instructions to the heaters or chillers to control the temperature of the fluid. These instructions to the valve 204 are also based at least in part on the measured displacement of the fixed bearing sidewall 180. The resultant actions of both the temperature regulation system 200 and the temperature control of the reservoir 206 control the temperature of the fixed bearing sidewall 180, which in turn controls displacement of the fixed bearing sidewall 180. Moreover, the instructions generated by the processor 140 may also be based at least in part on one or more recipes stored in the memory 150.

In one example, the processor 140 may determine temperature set point based on the measured displacement of the fixed bearing sidewall 180 or portions thereof. The processor then communicates instructions to the temperature regulation system 200 to cool the fluid based on the measured displacement of the fixed bearing sidewall 180 or portions thereof. The reduction in temperature of the fluid reduces the temperature of the fixed bearing sidewall 180, which in reduces or eliminates their displacement. The temperature sensors 134, 136 may also be used to measure the temperature of the fluid and/or fixed bearing sidewall 180 and communicate these temperature measurements to the processor 140. These temperature measurements function as feedback for the processor 140.

In another example, only the temperature of the fluid is controlled and the displacement of the fixed bearing sidewall 180 is not measured during slicing of the ingot 102. In these embodiments, the temperature regulation system 200 controls the temperature of the fluid to control the temperature of the fixed bearing sidewall 180 according to a temperature set point. This temperature set point may be retrieved from a recipe as described above. Alternatively, it may be received as an input to the system 100 from a user or other computer system. The system 100 may measure the temperature of the fluid with the respective sensors 134, 136 in some embodiments and use the measurement as feedback to control the temperature regulation system 200.

Figure 12:
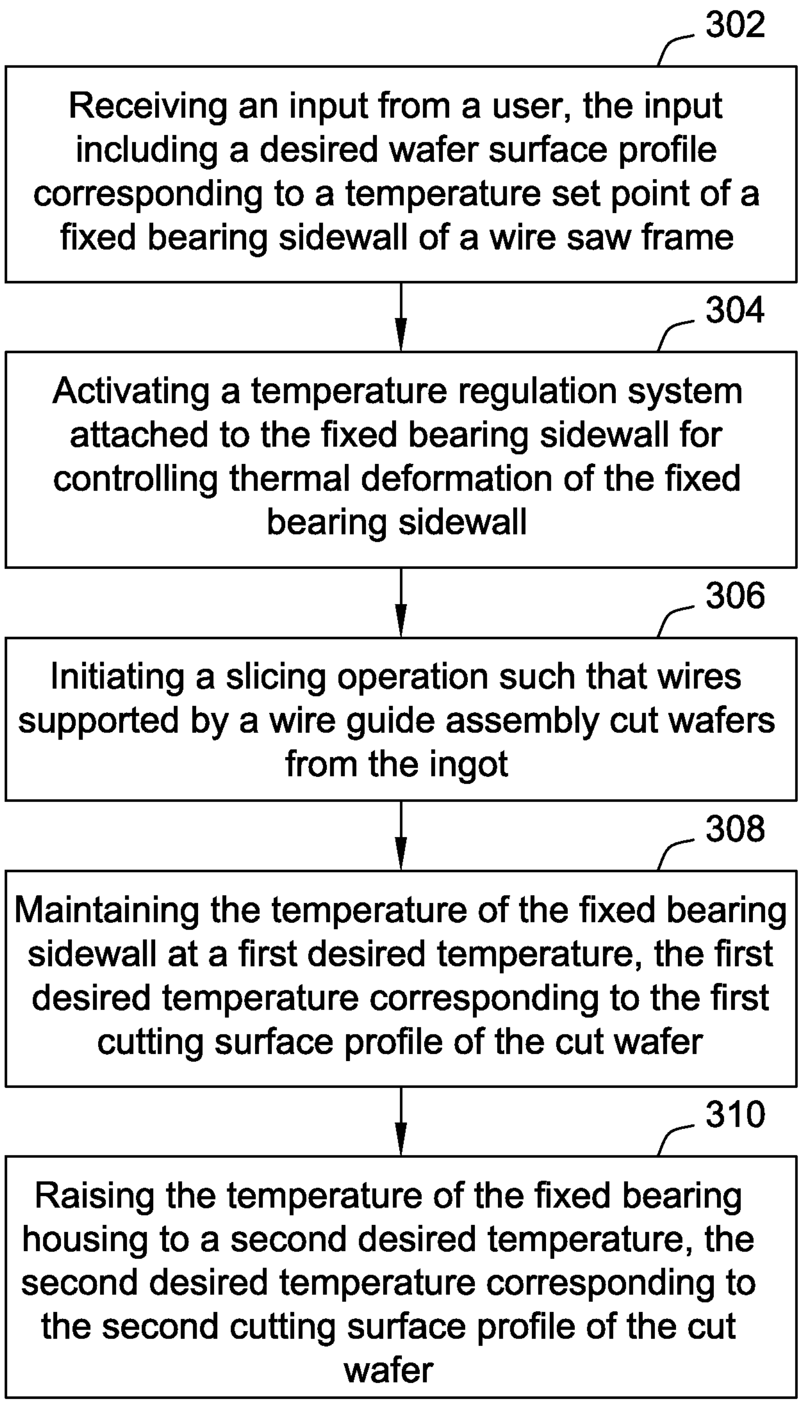
FIG. 12 is a block diagram of a method in accordance with an embodiment.

A method for slicing an ingot into wafers using a wire saw is illustrated in FIG. 12. The method includes receiving 302 an input from a user, the input including a desired wafer surface profile corresponding to a temperature set point of a fixed bearing sidewall of a wire saw frame; activating 304 a temperature regulation system attached to the fixed bearing sidewall for controlling thermal deformation of the fixed bearing sidewall, the thermal deformation of the fixed bearing sidewall corresponding to the desired wafer surface profile; and, initiating 306 a slicing operation such that wires supported by a wire guide assembly cut wafers from the ingot, the wire guide assembly including rollers having a first end connected to the fixed bearing sidewall and a second end supported by a free bearing sidewall of the wire saw frame, wherein the wire guide rotates on a bearing, wherein thermal deformation of the fixed bearing sidewall from a first state to a second state corresponds to a change in a cutting surface profile of a cut wafer from a first cutting surface profile to a second cutting surface profile. In some embodiments, the method 300 further includes maintaining 308 the temperature of the fixed bearing sidewall at a first desired temperature, the first desired temperature corresponding to the first cutting surface profile of the cut wafer. In some embodiments, the method further includes raising 310 the temperature of the fixed bearing housing to a second desired temperature, the second desired temperature corresponding to the second cutting surface profile of the cut wafer.

The method may also include lowering the temperature of the fixed bearing housing to a third desired temperature, the third desired temperature corresponding to a third cutting surface profile of the cut wafer. The method may further include retrieving, by the processor, wafer surface profiles from the memory, wherein the processor is configured for communicating instructions to the control system to control the temperature regulation system. In some embodiments, the method further includes activating a valve of the temperature regulation system for controlling temperature of the fixed bearing sidewall.

The systems and methods described control the nanotopology and shape of wafers cut in a wire saw machine 103. It has been determined that in prior systems, the fixed bearing sidewall 180 or portions thereof may be subject to displacement or move during slicing of the ingot 102. This displacement of the fixed bearing sidewall 180 may remain relatively constant during slicing of the ingot 102 by the wire saw 103. Displacement of the rotating races 116, however, is readily apparent. This displacement of the bearings 114 causes displacement of the wire guides 106 and wires 104 of the saw 103 due to deformation of the fixed bearing sidewall 180. Displacement of the wire guides 106 and wires 104 in turn causes defects in the shape and/or nanotopology of wafers sliced from the ingot 102. Entry and exit marks are types of such defects. The displacement of the bearings 114 may be caused by a change in temperature of the fixed bearing sidewall 180, and thus a change in temperature of the fluid in thermal communication with the fixed bearing sidewall 180.

By controlling the temperature of the fluid in contact with the fixed bearing sidewall 180, the systems and methods described herein control the temperature of the fixed bearing sidewall 180. The control of the temperature of the fixed bearing sidewall 180 in turn controls their displacement. Accordingly, the displacement of the fixed bearing sidewall 180 can be minimized or eliminated by controlling their temperature. By doing this, the displacement of the wire guides 106 and wires 104 can be minimized or eliminated as well. As such, defects (e.g., entry or exit marks) in the shape of the wafers and/or their nanotopology can be reduced or eliminated. This reduction in defects increases the yield of the wafer manufacturing process. Furthermore, downstream processing operations (e.g., grinding) may be reduced in duration or eliminated, thus reducing the time and cost of manufacturing the wafers.

The systems and methods also enable control of the shape and/or nanotopology of the wafers, in addition to, or in place of, reducing or eliminating other defects (e.g., entry or exit marks). A user is thus able to input a predetermined shape and/or nanotopology profile of wafers sliced from the ingot 102. Users may need wafers to have differing shapes and/or nanotopology for a variety of reasons.

When introducing elements of the present disclosure or the embodiments thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above without departing from the scope of the present disclosure, it is intended that all matter contained in the above description and shown in the accompanying drawings shall be interpreted as illustrative and not in a limiting sense.

What is claimed is:

1. A system for controlling the surface profile of wafers sliced from an ingot in a wire saw comprising:
- a wire saw frame including:
  - a fixed bearing sidewall;
  - a free bearing sidewall opposite the fixed bearing sidewall; and
  - one or more bearings connected to the fixed bearing sidewall;
- a wire guide assembly for supporting wires, the wire guide assembly including wire guides having a first end rotatably connected to the one or more bearings and a second end supported by the free bearing sidewall, wherein the second ends of the wire guides are movable relative to the free bearing sidewall, wherein thermal deformation of the fixed bearing sidewall from a first state to a second state corresponds to a change in displacement of the one or more bearings and a change in a cutting surface profile of a cut wafer from a first cutting surface profile to a second cutting surface profile;
- a temperature regulation system attached to the fixed bearing sidewall for controlling thermal deformation of the fixed bearing sidewall, wherein controlling thermal deformation of the fixed bearing sidewall controls displacement of the one or more bearings;
- a control system for controlling the temperature of the fixed bearing sidewall including a temperature sensor for measuring the temperature of the fixed bearing sidewall; and
- a processor connected to the temperature regulation system and the control system, the processor configured to control the temperature of the fixed bearing sidewall at a desired temperature by activating the temperature regulation system.

2. The system of claim 1, wherein the processor is configured to maintain the temperature of the fixed bearing sidewall at a first desired temperature, the first desired temperature corresponding to the first cutting surface profile of the cut wafer.

3. The system of claim 1, wherein the processor is configured to raise the temperature of the fixed bearing sidewall to a second desired temperature, the second desired temperature corresponding to the second cutting surface profile of the cut wafer.

4. The system of claim 1, wherein the processor is configured to lower the temperature of the fixed bearing sidewall to a third desired temperature, the third desired temperature corresponding to a third cutting surface profile of the cut wafer.

5. The system of claim 1, wherein the control system further comprises a memory for storing temperature profiles, each temperature profile associated with a cutting surface profile and defining a temperature set point for the fixed bearing sidewall, the processor configured to retrieve the associated temperature set points from the memory, the processor configured for communicating instructions to the control system to control the temperature regulation system.

6. The system of claim 1, wherein the temperature regulation system includes fluid channels and a valve in fluid connection with the fluid channels, the processor connected to the valve, the processor configured to maintain the temperature of the fixed bearing sidewall at a desired temperature by activating the valve.

7. The system of claim 6, wherein the fluid channels are internal to the fixed bearing sidewall.

8. The system of claim 7, wherein the fluid channels are on an inner surface of the fixed bearing sidewall.

9. The system of claim 6, wherein the fluid channels are on an outer surface of the fixed bearing sidewall.

10. The system of claim 1, wherein the temperature regulation system includes a heat exchanger, the processor communicatively connected to the heat exchanger, the processor configured to maintain the temperature of the fixed bearing sidewall at a desired temperature by activating the heat exchanger.

11. The system of claim 1 further comprising a sensor connected to the fixed bearing sidewall for measuring thermal displacement of the fixed bearing sidewall.

12. The system of claim 1 wherein the control system is connected to a valve of the temperature regulation system for controlling a flow rate of fluid of the temperature regulation system.

13. A system for controlling a cutting surface profile of wafers cut from an ingot by a wire saw, the system comprising:
- a temperature regulation system attached to a fixed bearing sidewall of a wire saw frame for controlling thermal deformation of the fixed bearing sidewall, wherein controlling thermal deformation of the fixed bearing sidewall controls displacement of one or more bearings connected to the fixed bearing sidewall and a change in a cutting surface profile of a cut wafer;
- a control system for controlling the temperature of the fixed bearing sidewall including a temperature sensor for measuring the temperature of the fixed bearing sidewall and a displacement sensor for measuring thermal deformation of the fixed bearing sidewall; and
- a processor in communication with the temperature regulation system and the control system, the processor configured to control the temperature of the fixed bearing sidewall at a desired temperature by activating the temperature regulation system.

14. The system of claim 1, wherein the one or more bearings connected to the fixed bearing sidewall includes a rotating race connected to the wire guide and a stationary race connected to the fixed bearing sidewall.

15. The system of claim 13, wherein each of the one or more bearings connected to the fixed bearing sidewall includes a stationary race connected to the fixed bearing sidewall and a rotating race, wherein the rotating race is rotatable relative to the stationary race.

* * * * *